April 5, 1966 YUKIO YASUKAWA 3,244,472
SMALL-SIZED MOVIE CAMERAS WITH A DOUBLE TRACK FILM
Filed June 1, 1964 6 Sheets-Sheet 2

April 5, 1966     YUKIO YASUKAWA     3,244,472
SMALL-SIZED MOVIE CAMERAS WITH A DOUBLE TRACK FILM
Filed June 1, 1964                                        6 Sheets-Sheet 6

United States Patent Office 3,244,472
Patented Apr. 5, 1966

3,244,472
SMALL-SIZED MOVIE CAMERAS WITH A
DOUBLE TRACK FILM
Yukio Yasukawa, Suwa-shi, Japan, assignor to Sankyo
Kogaku Kogyo Kabushiki Kaisha, Suwa-shi, Japan, a
corporation of Japan
Filed June 1, 1964, Ser. No. 371,589
Claims priority, application Japan, Sept. 19, 1963,
38/50,181
4 Claims. (Cl. 352—83)

The present invention relates to small-sized movie cameras adapted for operation with a double track film.

In a conventional method of movie making with a double track film loaded in an 8 mm. movie camera, a side cover of the camera is opened at the completion of shooting or exposure on one film track of the film, positions of a film take-up reel and a supply reel are replaced with each other, and subsequent shooting is made on the other track of the film. This method of photographing or shooting on the double track film is defective in that not only the end portion of the film is uselessly exposed to light during the replacing operation of the respective reels, but also such operation is quite troublesome. As an improvement in the just described camera, there is proposed a camera in which a film magazine is employed, and thus useless exposure of the end portion of a film can be avoided. However, the camera of this type is also defective in that a side cover of the camera must be opened at the completion of shooting on one track of the film and said film magazine must be taken out and refitted in upside down relation, which operation is troublesome likewise. In an attempt to avoid the drawbacks involved in such cameras, there is already proposed a camera in which a film chamber corresponding to said film magazine is mounted in the camera in a manner that it is rotatable with relation to the body of the camera so that said film chamber can be rotated 180° at the completion of shooting on one track of a double track film, for subsequent shooting on the other track of the film.

The present invention proposes a further improvement in the last mentioned type of camera and has for its object to provide a small-sized movie camera adapted for operation with a double track film and having a better performance over prior cameras of this type.

A movie-making camera according to the invention is so arranged that a sleeve carrying the shooting or objective lens is rotatably supported by a stationary supporting member having a pistol type handle grip at the lower portion thereof, and the body of the camera including a shutter mechanism, film chamber and any other elements is mounted on the stationary supporting member so as to be also rotatable relative to the stationary supporting member.

An important feature of the invention resides in that a rear end edge of a mounting plate for film reels (on the back side of the camera) is swingably mounted in a film chamber in the body of the camera so that, when shooting on one track of a double track film has been completed, the camera body can be rotated through an angle of 180° relative to the stationary supporting member about the optical axis of the shooting lens to provide swinging movement of the reel mounting plate in association with the above rotation, whereby the double track film can be translated in the direction of its width at the free end (or portion closer to the shooting lens) of the mounting plate for enabling to make subsequent shooting on the other track of the double track film.

Another specific feature of the invention resides in the provision of two claws, one of which is used solely for feeding the film during shooting on one track of the double track film, while the other is used solely for feeding the film during shooting on the other track thereof.

There are other objects and particularities of the invention which will become obvious from the following description with reference to the accompanying drawings, in which.

Figure 1:
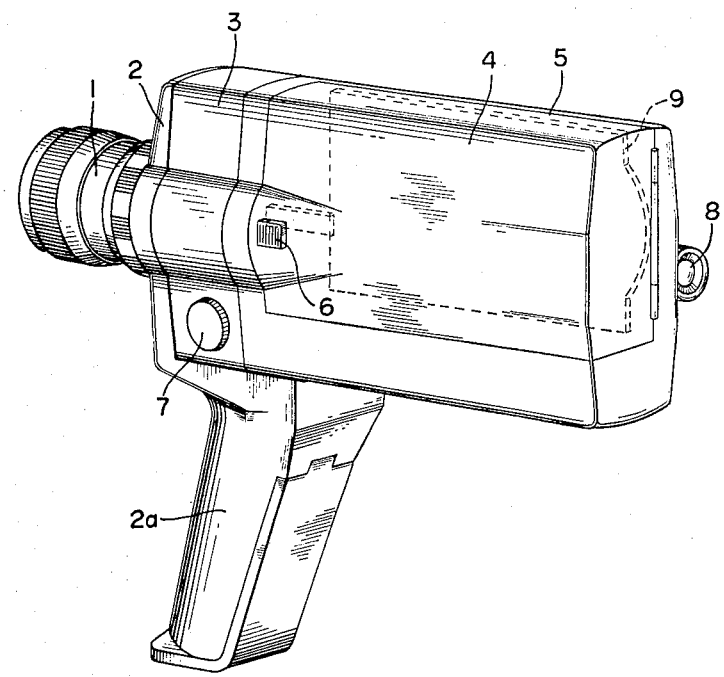
FIG. 1 is a perspective view of an embodiment of a small-sized movie camera according to the invention.

Now, the invention will be described with reference to a preferred embodiment thereof illustrated in the accompanying drawings. In FIG. 1, there is shown a movie camera according to the invention which includes a lens-carrying sleeve 1, the base portion of which is supported rotatably in a stationary supporting member 2 having an integrally formed pistol type handle grip 2a at the lower portion thereof. Rearwards of said stationary supporting member 2, there is provided a casing 3 which contains such elements as a shutter mechanism and film-feeding claws. Further, rearwards of said casing 3, there is disposed a film chamber 5 which is integrally fixed to the casing 3 and has a side cover 4 forming the side wall of the film chamber 5. The side cover 4 is hinged to the film chamber 5 at the rear side face thereof and arranged to be opened and closed by means of a suitable locking member 6 disposed adjacent the free end of the cover 4.

Figure 3:
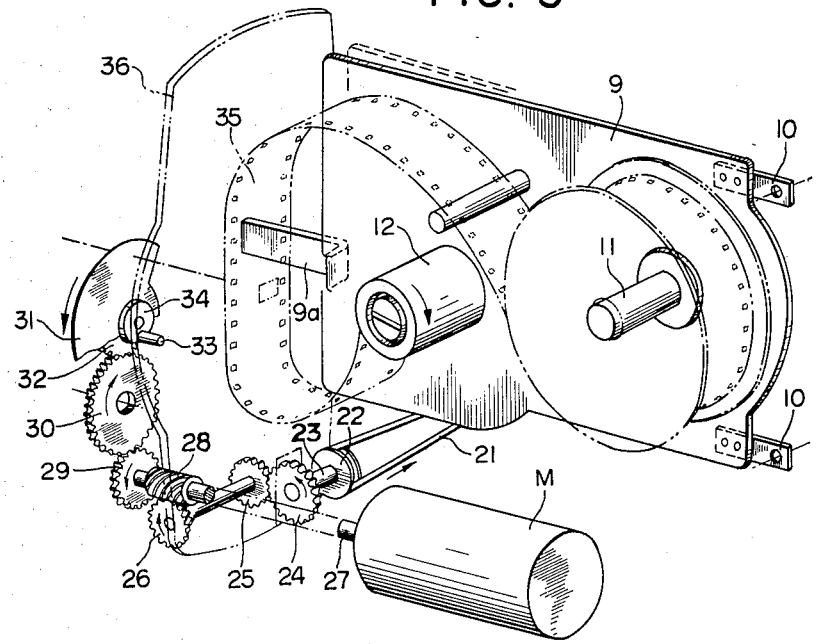
FIG. 3 is a perspective view of a swinging plate for mounting film reels thereon and a shutter drive mechanism.

A knob 7 rotatably fitted on the lower side face of the casing is for the purpose of controlling the speed of the shutter contained in said casing 3. A lens 8 is shown at the side of the rear face of the camera in FIG. 1. This is an eye lens of an optical system for a view finder disposed along the optical axis of the shooting lens, and this optical system extends forwardly from outside of the side wall of the casing 3 into the casing 3 and passes through a prism disposed on the optical axis of the shooting lens so that a single lens reflex type view finder is thereby formed. A film-reel mounting plate 9 disposed in the film chamber 5 is shown in dotted line. As shown in FIG. 3, the mounting plate 9 is swingably fitted to the body of the camera by means of a pair of resilient strips 10, 10 provided at upper and lower extremities of the rear end edge of the mounting plate 9. The term, camera body referred to above will be used hereinafter to inclusively denote the assembly comprising the film chamber 5, casing 3 and sleeve 1 carrying the shooting lens.

Since the camera body is rotatably supported on the stationary supporting member 2 as described above, the entirety of mechanisms contained in the camera body will be inverted upside down when the handle grip 2a is held by right hand and the camera body is rotated through an angle of 180° in a clockwise direction as viewed from the side of the shooting lens. A suitable stopper is provided on the camera body so that the camera body may not be rotated more than 180° with respect to the stationary supporting member 2. Therefore, it will be understood that the camera body can readily be restored to the original position from its inverted position by merely rotating it in a direction opposite to the direction in which it is inverted upside down.

In FIG. 3, it will be seen that two shafts 11 and 12 are rotatably and parallelly disposed on the reel mounting plate 9 in suitably spaced apart relation to each other. One of the shafts 11 is adapted to receive thereon a film reel as known in the art, while the other shaft 12 has a greater diameter than that of the shaft 11 and is adapted to directly receive thereon the tip portion of a double track film, instead of a film reel.

Figure 4:
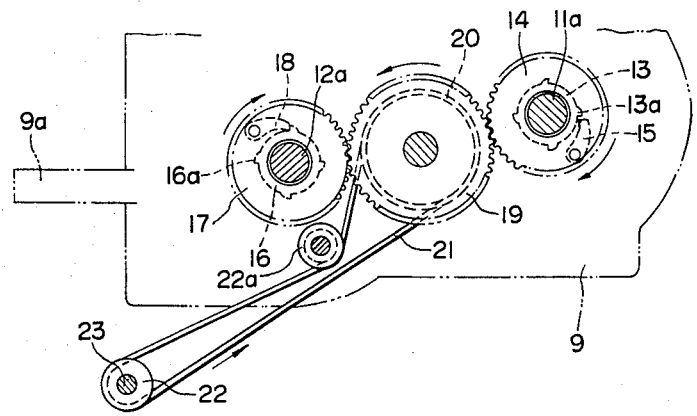
FIG. 4 is a front elevational view of a drive mechanism for a film wind shaft and a film supply shaft disposed on the swinging plate which is shown in phantom line.

FIG. 4 shows a train of gears disposed on the back side of the mounting plate 9 shown in FIG. 3. Shafts 11a and 12a are connected with the shafts 11 and 12 of FIG. 3, respectively, through suitable frictional coupling means. At the end of the shaft 11a, there is firmly fixed a clutch disk 13 which has a plurality of small lugs 13a on its periphery, and a gear 14 loosely mounted on the shaft 11a is interposed between the clutch disc 13 and the reel mounting plate 9 and spaced a suitable distance therefrom. An engaging pawl 15 is pivotally fitted at its base portion to the rear face of the gear 14 to cooperate with the lugs 13a, and the free end of the pawl 15 is normally urged towards the periphery of the clutch disk 13 for pressure contact therewith. When, therefore, the gear 14 rotates counter-clockwise (opposite to the direction of arrow) in FIG. 4, the lug 13a is forcedly driven by the tip of the engaging pawl 15, hence the shaft 11a and the shaft 11 frictionally coupled thereto are made to rotate in unitary relation in the same direction. When, however, the gear 14 rotates clockwise or in the direction of arrow in FIG. 4, no rotational movement is imparted to the shaft 11a. For the other shaft 12a, a clutch disk 16 having lugs 16a, and a loosely mounted gear 17 with an engaging pawl 18 are provided likewise. In the case of the shaft 12a, when the gear 17 rotates in the direction of arrow or clockwise in FIG. 4, the lug 16a is forcedly driven by the free end of the engaging pawl 18, and the shaft 12a is rotated in the same direction. However, rotation of the gear 17 in the opposite direction will not impart any rotational movement to the shaft 12a.

The gears 14 and 17 are made to have same dimensions and adapted for rotation by a common driving gear 19 which is in meshing engagement with both of them. A grooved pulley 20 is firmly fixed on the rear face of the driving gear 19, and a belt 21 is passed about the grooved pulley 20 and a small grooved pulley 22 for transmitting rotational movement to the driving gear 19. A guide roller 22a is pivotally mounted on the mounting plate 9 to guide the belt 21. A gear 24 is firmly fixed on a shaft 23 of the small grooved pulley 22 as shown in FIG. 3 and rotated by a worm 28 on a shaft 27 of an electric motor M through a gear 25 and a worm wheel 26. A gear 29 is firmly fixed on the end of the shaft 27 of the electric motor M and operative to transmit rotational movement through an intermediate gear 30 to a gear 32 coaxially and integrally fitted to a shutter blade 31.

A disk 34 is firmly fixed on the rear face (or the face on the side of the film chamber) of the shutter blade 31 in coaxial relation thereto, and has an eccentric pin 33 firmly secured thereto and extending in the axial direction thereof. The eccentric pin 33 is adapted to cooperate with film feeding claws as will be explained later. The electric motor M is operated by a battery contained in the handle grip and adapted to be selectively rotated in normal and reverse directions by suitably switching over the polarity of the battery connected to the motor. Such switch-over control of the normal and reverse rotation can be automatically effected in association with 180° rotation of the camera body with relation to the stationary supporting member 2 as described already. Or more precisely, when the electric motor M is energized by pushing down a shutter button (not shown) in the state as shown in FIG. 3, the transmission elements shown in FIG. 3 are rotated in the direction of arrows to rotate the shaft 12 on the reel mounting plate 9 in the direction of arrow. It will be apparent that, as described already, no rotational movement is transmitted in this case to the other shaft 11 on the reel mounting plate 9. Therefore, the film 35 is made to advance in the direction of arrow and taken up on the shaft 12. Then, when the shutter button is depressed for energizing the electric motor with the camera body rotated 180° with respect to the stationary supporting member 2, the transmission elements are rotated in the directions opposite to arrows in FIG. 3, and the film is also advanced in the direction opposite to arrow shown.

Figure 2:
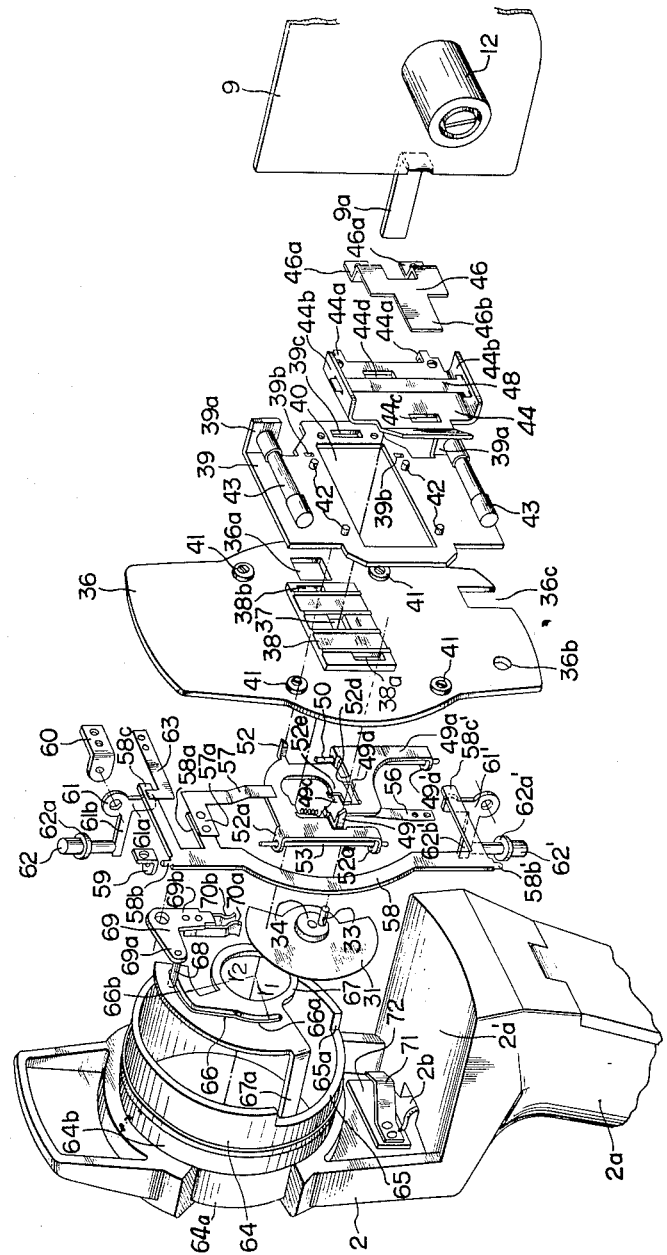
FIG. 2 is a view (on drawing) of details showing the internal structure of the movie camera of the invention.
Figure 9:
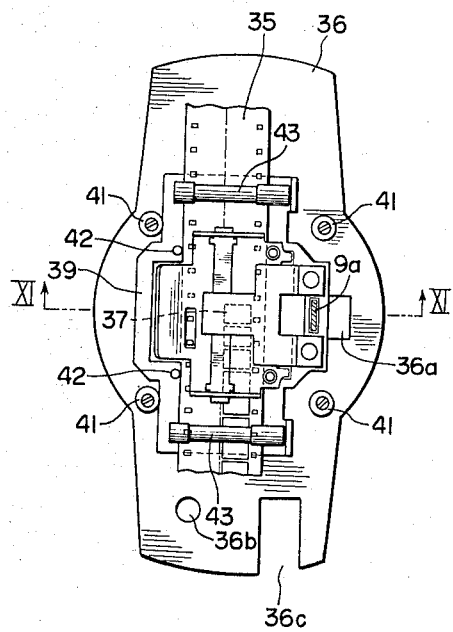
FIG. 9 is an elevational view showing a position of the slidable plate relative to a partition plate on which the slidable plate is mounted, the view being taken from the film chamber.

In the middle of FIG. 2, there is shown a partition plate 36 which is firmly fixed to the camera body at right angles with the optical axis of the shooting lens. The camera body is substantially divided into two sections by the partition plate 36, one of which sections disposed forwards of the partition plate 36 (or section closer to the shooting lens) contains therein such elements as film feeding claws and shutter mechanism, while the other section disposed rearwards of the partition plate 36 is assigned for the film chamber. At the central portion of the partition plate 36, there is firmly secured a plate 38 of rectangular shape in which a shooting window 37 lying on the optical axis of the shooting lens is bored. A rectangular opening 40 bored in a slidable plate 39 is loosely fitted on the plate 38. The lateral width of the rectangular opening 40 is made wider than that of the plate 38, and the slidable plate 39 is fitted on the partition plate 36 by suitable means so that the slidable plate 39 can make a sliding movement in the lateral direction by being guided by upper and lower edges of the window plate 38. The lateral displacement of the slidable plate 39 is limited by four or two pairs of stoppers 41 provided in suitably spaced apart relation on the partition plate 36. The stoppers 41 are each fitted by means of an eccentric screw so that, when the eccentric screws are loosened, the stoppers 41 can suitably be rotated to adjust the distance between the stoppers 41 forming each lateral pair. In an operative position, the peripheral edges of the stoppers 41 are in abutment with a portion of the side edge of the slidable plate 39 as shown in FIG. 9. In FIG. 2, it will be seen that four guide pins 42 forming a passage of the film are firmly secured on the slidable plate 39 at positions adjacent the upper and lower edges of the rectangular opening 40. The lateral distance between the guide pins 42 is made equal to the width of the film. The slidable plate 39 has integral lugs 39a which extend at right angles therewith from upper and lower portions of the right-hand side edge thereof as viewed from the rear end of the camera body. A film guide rod 43 is firmly secured at its base to each lug 39a in a manner that the guide rods 43 are parallelly juxtaposed in the horizontal direction. The film is therefore guided through a space between each guide rod 43 and the slidable plate 39 and by the lateral pairs of guide pins 42.

Figure 5:
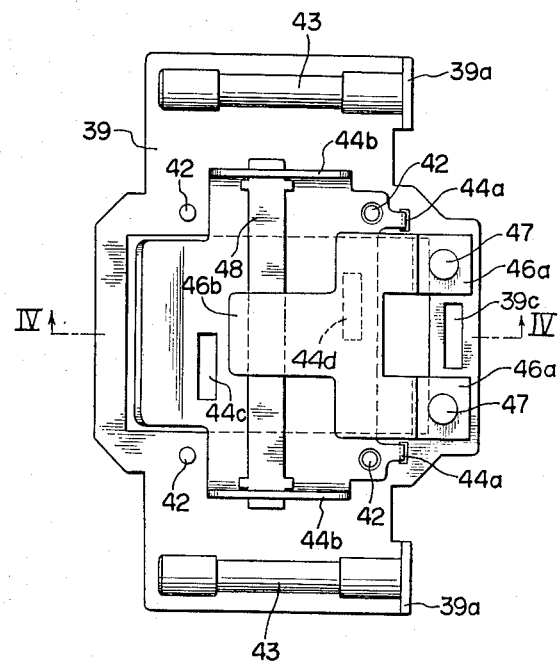
FIG. 5 is an elevational view of a pressure plate for film and a slidable plate to which the pressure plate is fitted, the view being taken from a film chamber in the camera.
Figure 6:
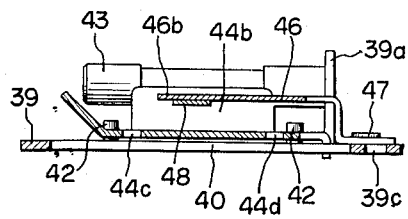
FIG. 6 is a sectional view taken on the line VI—VI in FIG. 5.

A pressure plate 44 is provided to bring the film into light abutment with the window plate 38 and has lugs 44a extending forwardly in juxtaposed relation from the upper and lower portions of the right-hand side edge thereof. The lugs 44a are adapted to loosely engage small apertures 39b of square shape bored in the vicinity of the right-hand side guide pins 42 on the slidable plate 39, so that the pressure plate 44 is swingably mounted on the slidable plate 39. A holding plate 46 is effective to prevent the pressure plate 44 from disengaging the slidable plate 39. FIGS. 5 and 6 show the slidable plate 39, pressure plate 44 and holding plate 46 in a unitary assembled state, and it will be seen that a pair of legs 46a of the holding plate 46 are firmly fixed to the right-hand side portion of the slidable plate 39 by means of rivets 47. Each of the legs 46a is bent stepwise, and the lower face of a projection 46b extending leftwards from the holding plate 46, as shown in FIG. 6, bears against the upper face of a resilient strip 48, so that the pressure plate 44 is pressed onto the window plate 38. The resilient strip 48 is supported at its upper and lower ends in a pair of upper and lower rising portions 44b, respectively, as shown in FIG. 5. Two elongated longitudinal slots 44c and 44d are bored in the pressure plate 44 in parallel with each other as shown in FIG. 2. The lateral distance between the slots 44c and 44d is so selected as to be equal to the distance between longitudinal rows of perforations disposed along both side edges of the double track film.

Figure 12:
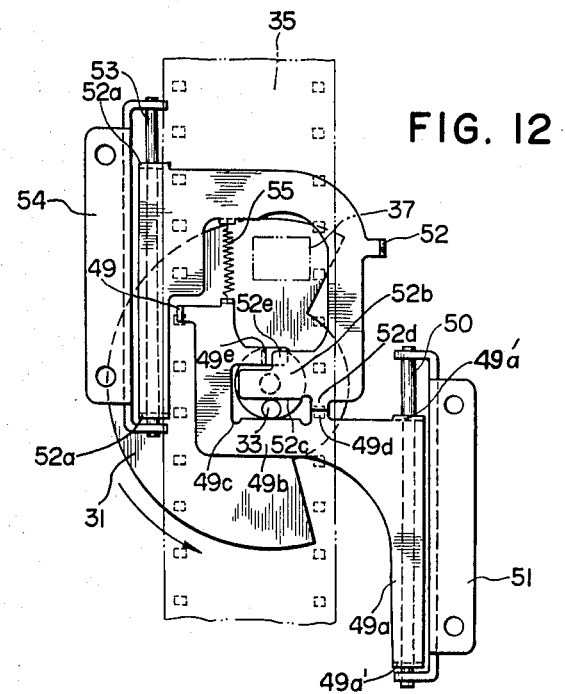
FIG. 12 is an elevational view showing positions of claws relative to a film, the view being taken from the film chamber.

In the front of the partition plate 36, there is provided claw means for feeding the film as shown in FIG. 12. FIG. 12 shows a view of the claw means taken from the side of the film chamber. The claw means comprises a first member having a first film-feeding claw 49 formed integrally therewith and disposed to align with the left-hand side row of perforations in the double track film 35. The base portion of the first member depends from the right-hand side thereof to form a depending portion 49a, and lugs 49a'a extend towards the shooting lens from the upper and lower extremities of the depending portion 49a. A pin 50 penetrates loosely through the lugs 49a' and is supported at its upper and lower ends by a member 51 which is rigidly fixed on the front face of the partition plate 36. The claw means further comprises a second member having a second film-feeding claw 52 integrally formed therewith which appears at the upper right-hand side portion of FIG. 12. As in the case of first claw 49, lugs 52a extend towards the shooting lens from the left-hand side portion of upper and lower edges of the second member, and a pin 53 penetrates loosely through the lugs 52a. Also as in the case of the pin 50, the pin 53 is supported at its upper and lower ends by a member 54 which is rigidily fixed on the front face of the partition plate 36.

A portion of the second member extends downwardly from the base portion of the second claw 52 and is bent leftwards at its lower end to form a curved portion 52b. The lower edge 52c of the curved portion 52b opposes the upper edge 49c of a horizontal arm 49b of the first member, and the eccentric pin 33 on the shutter blade 31 is loosely fitted in a space between the edges 49c and 52c. A projection 52d extends downwardly from a right-hand side portion of the lower edge 52c, and the lower end face of the projection 52d is in abutment with the upper end face of a projection 49d which extends upwardly from a right-hand side portion of the upper edge 49c of the first member. The upper edge of the curved portion 52b is stepped to form a land 52e, and the front face (or back face as viewed in FIG. 12) of the land 52e overlaps on the tip portion of a branch piece 49e extending rightwards from the first member at a portion adjacent the upper end thereof.

A tension spring 55 is connected at one end to the first member at a suitable portion of its upper edge and at the other end to a suitable portion of the lower edge of the second member so as to normally urge the first and second members towards each other so that the end faces of the projections 49d and 52d are brought into pressure contact. A leaf spring 56 is firmly secured at its base portion on the partition plate 36, and the free end of the spring 56 is in pressure contact with the left-hand side portion of the horizontal arm 49b of the first member from the side of the shooting lens, as shown in FIG. 2, so that the first member is normally urged towards the partition plate 36 to make pressure contract therewith. As shown in FIG. 12, the lateral distance between the first claw 49 and the second claw 52 is made greater than the width of the double track film 35. The manner of operation with these claws is such that, when the first claw 49 successively engages the left-hand side perforations of the film to feed the film downwardly, exposure is effected on the first film track of the double track film. When, by the operation as will be described later, the film 35 is translated rightwards from the position shown in FIG. 12 and the second claw 52 is made to engage with one of the right-hand side perforations of the film, the shooting window 37 is brought to a position at which it aligns with the second film track of the double track film 35 and now exposure is effected on the second film track.

In the assembled state of the partition plate 36 and the claw means, the claws 49 and 52 project rearwardly through respective slots 38a and 38b bored in the window plate 38 at opposte positions as shown in FIG. 2 and are positioned at the passage of the double track film 35. The upper portion of the tip of the first claw 49 is cut aslant, while the lower portion of the second claw 52 is cut aslant. Therefore, when the first claw 49 engages the perforation of the film and is actuated by the eccentric pin 33 on the shutter blade 31 by the rotation of the shutter blade 31, the film 35 is fed downwardly, while, when the second claw 52 is in engagement with the perforation of the film, the film is fed upwardly in FIG. 12.

In FIG. 2, an L-shaped sheet strip 57 is firmly fixed at its arm 57a to a branch arm 58a of a swinging lever 58, and the other arm of the sheet strip 57 extends downwardly and is interposed between the second member and the partition plate 36. Projections 58b and 58b' are integrally formed and made to protrude upwardly and downwardly from upper and lower ends of the swinging lever 58, respectively, and swingably received in respective ears 59 firmly fixed on the front face of the partition plate 36. The swinging lever 58 has integral arms 58c and 58c' which extend rightwards in FIG. 2 from the upper and lower ends of the lever 58, respectively. A bell crank 61 is pivotally mounted on an ear 60 which is fixed to the front face of the partition plate 36. One arm 61a of the bell crank 61 is made to abut at right angles with the front face of the tip portion of the upper arm 58c of the swinging lever 58, while the other arm 61b of the bell crank 61 extends forwardly in parallel with the optical axis of the shooting lens. The upper edge of the tip portion of the arm 61b is contacted by the lower end of a stub shaft 62, the head of which extends outwardly of the camera body. A bell crank 61' and a stub shaft 62' are also operatively engaged with the lower arm 58c' of the swinging lever 58. The stub shafts 62 ad 62' are normally urged to escape outwardly of the camera body and this tendency toward escape is effectively prevented by respective collars 62a and 62a' provided on them.

A leaf spring 63 is firmly fixed at one end to the front face of the partition plate 36, and the free end of the spring 63 is brought into pressure contact with the tip portion of the upper arm 58c of the swinging lever 58 at a position opposite the arm 61a of the bell crank 61, so as to normally urge the tip of the arm 58c forwardly. Therefore, the swinging lever 58 is provided with a tendency to rotate counter-clockwise, as viewed from above the camera body, about its pivots 58b and 58b', and the second member is also provided with a tendency to rotate in the same direction about its pivot 53 by being urged by the sheet strip 57. However, the swinging lever 58 is locked against rotation since the lower end face of the lower stub shaft 62' is pressed and urged inwardly by an upper curved face 2a' of the handle grip 2a. The upper curved face 2a' forms a portion of a cylindrical face concentrical with the optical axis of the shooting lens, and upper and lower wall faces of the camera body in FIG. 1 also form a part of a cylindrical face which has a contour complementary to the curved face 2a'. When the camera body is held in the state as shown in FIG. 1, the stub shaft 62' is forced inwardly into the camera body and thrusts the arm 58c' of the swinging lever 58 against the partition plate 36 through the bell crank 61'. In case the camera body is rotated 180° about the optical axis of the shooting lens, the upper stub shaft 62 is now forced inwardly into the camera body by the curved face 2a' and thrusts the arm 58c of the swinging lever 58 against the partition plate 36.

A stationary sleeve 64 is firmly fitted at its forward end in the stationary supporting member 2 extending integrally upwardly from the handle grip 2a and disposed coaxially with the optical axis of the shooting lens. The stationary sleeve 64 extends rearwardly from the stationary supporting member 2 and the front portion of the camera body is rotatably fitted on an outer peripheral face 64b of the stationary sleeve 64. The rear end face of the stationary sleeve 64 is cut out through an angle of 90° to form a cut-out 65. Rearwardly of the stationary sleeve 64, a cam plate 67 is disposed in coaxial relation to the optical axis of the shooting lens and has a cam groove 66 of suitable shape. The cam plate 67 is mounted on a suitable supporting member (not shown) fitted to the partition plate 36 so as to be rotatable about the optical axis. An arm 67a extends forwardly in parallel with the optical axis of the shooting lens from a portion of the outer peripheral edge of the cam plate 67, and its tip portion is disposed in the cut-out 65 formed in the stationary sleeve 64. The cam groove 66 comprises two concentric arcuate grooves 66a and 66b having different radii $r_1$ and $r_2$ from the optical axis of the shooting lens, respectively, and a rectilinear groove connecting these two grooves. The cam groove 66 has an entire length which extends through an open angle of 90°. A pin 68 is firmly fixed at one end in one arm 69a of a bell crank 69 pivotally supported by the partition plate 36. The free end of the pin 68 is closely received in the extremity of the cam groove 66b having the radius $r_2$. On the front face of the other arm 69b of the bell crank 69, there are firmly fixed the base portions of two resilient strips 70a and 70b in opposed relation to each other. The free ends of the strips 70a and 70b are curved towards each other and are arranged to resiliently receive therebetween the tip portion of a bar 9a which extends forwardly from the forward edge of the film-reel mounting plate 9 as depicted on the right-hand side of FIG. 2. It will be understood that, when the various elements depicted in an explosive manner in FIG. 2 are brought together in the direction of the optical axis of the shooting lens and placed in a predetermined assembled state, the bar 9a passes through a slot 39c bored adjacent the right-hand side edge (as viewed from the rear end of the camera body) of the slidable plate 39, and through a square aperture 36a bored adjacent the right-hand side edge of the partition plate 36 and is finally held between the resilient strips 70a and 70b. The square aperture 36a in the partition plate 36 is made to have a substantially great width so as to permit a horizontally flat position of the bar 9a during its swinging movement.

An opening 2b is provided at the forward end of the upper curved face 2a' of the handle grip 2a so as to provide means of communication with the interior of the handle grip 2a. Above the opening 2b, a conductive strip 71 is fitted at one end on a longitudinal wall of the stationary supporting member 2 through a suitable electrical insulator 72. The conductive strip 71 is connected to one pole of the battery contained in the handle grip 2a by way of a conductor passing through the opening 2b, while the free end of the conductive strip 71 is made to abut a conductive terminal (not shown) provided at the front portion of the camera body and electrically insulated therefrom. The conductive terminal is connected to one terminal of the electric motor M contained in the camera body through a suitable switch (not shown) which is adapted to be opened and closed in association with actuation of a shutter button. The other pole of the battery in the handle grip 2a is connected with the other terminal of the electric motor M by way of the camera body.

An aperture 36b is formed in a lower portion of the partition plate 36 to permit passage therethrough of the conductor from the electric motor M. A cut-out 36c is also provided in the lower portion of the partition plate 36 so that the gear 24 shown in FIG. 3 can mesh through this cut-out 36c with the gear 25 disposed on the front side of the partition plate 36. Although many other tapped holes and suitable cut-outs are provided in the partition plate 36 for mounting thereon the various elements associated therewith, these are not illustrated in FIG. 2 in order to avoid complexity in the drawing.

The movie-making camera according to the invention operates in the following manner. In the following explanation, the word "right-hand" or "left-hand side" described with reference to the perspective views denotes that view is taken from the rear end of the camera body.

At first, the side cover is opened and a film reel is fitted on the shaft 11 as shown in FIG. 3. The tip of the film 35 is fitted to the shaft 12 which is specific to the inventive camera. In this case, the film 35 is mounted in a manner as shown in FIG. 9 so that shooting can first be made on the first track of the double track width. When so mounted, the first claw 49 is made to engage with the perforation on the left-hand side edge of the double track film 35, and the shooting window 37 is positioned above the first track as shown in FIG. 12. When, under this state, the shutter button (not shown) is depressed by a finger tip, the switch (not shown) associated therewith is closed, and the shutter blade 31 and the shaft 12 are made to rotate in the direction of arrows as shown in FIG. 3. At the same time, the first claw 49 makes a predetermined movement by being urged by the eccentric pin 33 on the shutter blade 31 to continuously feed the film downwardly on which shooting is properly effected. At the completion of the shooting on the first track of the film, the camera body is rotated counter clockwise through an angle of 180° with respect to the stationary supporting member 2 in FIG. 1 to invert the body upside down. In order to readily know the termination of shooting on the first track, a member such as a colored transparent plate may be associated with a suitable film metering means and may be inserted into the view finder when the shooting nearly ends, or alternatively the shutter blade may automatically be locked from operation when the shooting nearly ends.

Figure 7:
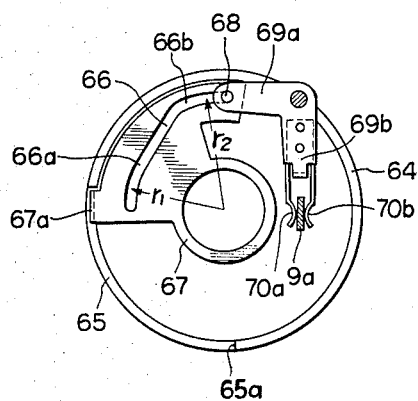
FIG. 7 is an elevational view showing a position of a cam plate disposed rotatably about the optical axis of the shooting lens relative to positions of a bell crank and a stationary sleeve cooperating with the cam plate, the view being taken from the film chamber.
Figure 8:
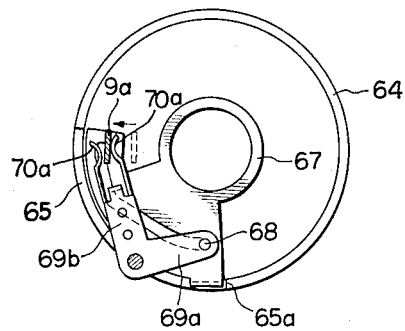
FIG. 8 is a view similar to FIG. 7, but showing a position in which a pivot pin of the bell crank is rotated 180° about the optical axis of the shooting lens.

As a result of above inversion, the pin 68 on the bell crank 69 pivotally mounted on the partition plate 36 travels in the cam groove 66 cooperating therewith. During its travel from the cam groove 66b of radius $r_2$ to the cam groove 66a of radius $r_1$, the pin 68 approaches towards the optical axis of the shooting lens by a distance of a difference between the radius $r_2$ and the radius $r_1$. Therefore, the bell crank 69 rotates together with the partition plate 36 about the optical axis of the shooting lens, and at the same time rotates counterclockwise about its own pivotal axis. The cam groove 66 extends through an open angle of approximately 90° as described in the foregoing. When, therefore, the camera body is rotated 180°, the pin 68 comes to abut the extremity of the cam groove 66a at the end of its 90° rotation and further thrusts the extremity of the cam groove 66a so that the cam plate 67 and the pin 68 rotate in unitary relation through the remaining angle of 90°, until finally the arm 67a of the cam plate 67 is brought into abutment with a shoulder 65a of the cut-out 65 formed in the stationary sleeve 64 and thereby restricted for further rotation, as shown in FIGS. 7 and 8.

Shortly after the rotation of the camera body has been started, the stub shaft 62' having been forced inwardly until such time by the upper curved face 2a' of the handle grip 2a is disengaged from the curved face 2a' and protrudes outwardly of the camera body, hence the swinging lever 58 locked against its tendency toward the swinging movement makes leftward rotation as viewed from above the camera body. Therefore, the sheet strip 57 depending from the branch arm 58a of the swinging lever 58 urges the second member to rotate about its axis 53 in the same direction with that of the swinging lever 58 against the resiliency of the leaf spring 56, so that the second claw 52 is fitted into the slot 38b in the window plate 38. At the same time, the tip of the branch piece 49e of the first member having the first claw 49 is urged by the land 52e of the second member, and the first claw 49 is disengaged from the perforation of the second film track with which the claw 49 has been engaged until such time. In a final stage of the rotation of the camera body, the upper stub shaft 62 is engaged by the upper curved face 2a' of the handle grip 2a, and the claws 49 and 52 are restored to their normal positions.

While the first and second claws 49 and 52 are retracted away from the film surface, the swinging plate 9 operates in the following manner. When the bell crank 69 rotates about its own pivotal axis while rotating about the optical axis of the shooting lens in unitary relation with the partition plate 36, as described already, the bar 9a extending from the swinging plate 9 and held between the resilient strips 70a and 70b is swung in a direction in which it is urged away from the optical axis of the shooting lens. This movement is best shown in FIGS. 7 and 8. FIG. 7 shows positions of the cam plate 67, bell crank 69 and bar 9a relative to the stationary sleeve 64 before the camera body is inverted upside down. FIG. 8 shows positions of these elements relative to each other when the camera body is inverted 180° about the optical axis of the shooting lens from the state shown in FIG. 7. As will be apparent especially from FIG. 8, the bar 9a is forced outwardly by the resilient strip 70a to be displaced away from the optical axis of the shooting lens.

Figure 10:
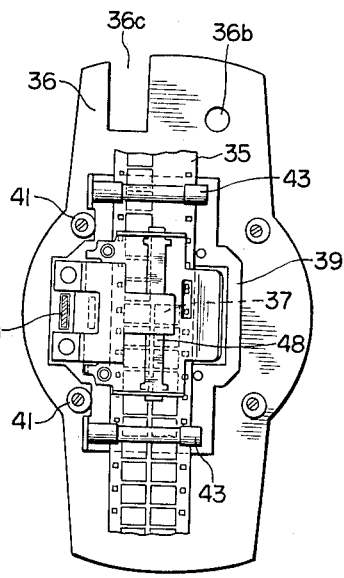
FIG. 10 is a view similar to FIG. 9, but showing a position in which the partition plate is rotated 180° about the optical axis of the shooting lens.
Figure 11:
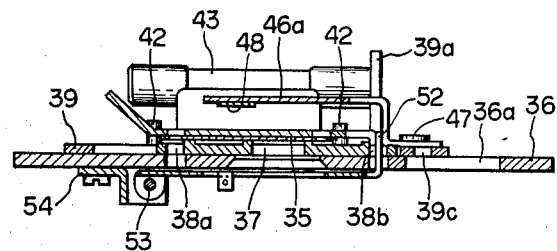
FIG. 11 is a sectional view taken on the line XI—XI in FIG. 9.

FIGS. 9 and 10 show a manner of displacement of the assembly of the slidable plate 39 and the pressure plate 44 mounted on the partition plate 36 when the bar 9a is urged to swing. FIG. 9 shows a situation before the camera body is inverted, and it will be seen that the right-hand side or the first track film of the double track film 35 held by the slidable plate 39 and the pressure plate 44 is fed downwardly past the shooting window 37. FIG. 10 shows a position of the slidable plate 39 relative to the partition plate 36 when the camera body is inverted 180° about the optical axis of the shooting lens from the state shown in FIG. 9. It will be apparent from FIG. 10 that the bar 9a is displaced outwardly, as a result of inversion of the camera body, to a position remote from the optical axis of the shooting lens from a position, shown in dotted line, close to the optical axis. Therefore, the slidable plate 39 is also displaced together with the bar 9a until it bears against the stoppers 41 on the partition plate 36, and thus it can be accurately placed at the operative position. In this state, the right-hand (or left-hand side in FIG. 9) track, or the second track film of the double track film 35 on the slidable plate 39 is positioned on the shooting window 37 in alignment therewith, and, at the same time, the second claw 52 comes in engagement with one of the perforations on the left-hand side (or right-hand side in FIG. 9) of the film. When, under this state, the shutter button is depressed as in the case of shooting on the first track film, the electric motor M shown in FIG. 3 rotates in the opposite direction and the shutter blade 31 is rotated in a direction opposite to arrow. Then, the film reel shaft 11 which has made an idle rotation during the shooting on the first track film now starts to rotate in a direction in which the film is taken up on the reel on the shaft 11. Thus, the second claw 52 feeds the film 35 downwardly in FIG. 10 (or upwardly in FIG. 9).

It will be understood that, as described in the foregoing, the camera body is inverted about the optical axis of the shooting lens, after shooting on one track of a double track film, to effect translational movement of the double track film, and the shutter blade is rotated in the opposite direction, while the film is also fed in the opposite direction. Therefore, by joining together the first and second track films after shooting on both tracks of the double track film has been completed and developed, it is possible to obtain a movie film which has continuous pictures and in which perforations are aligned on one side thereof.

A slight twist in the film may take place between the film supply shaft and the pressure plate and between the film wind shaft and the pressure plate, since the film is translated a small distance by the swinging movement of the film reel mounting plate 9 during the inversion of the camera body. However, such twist in the film can be rectified at positions above and below the pressure plate 44 by virtue of the provision of the guide rods 43 disposed above and below the pressure plate 44 in juxtaposition to each other in closely adjacent relation to the slideable plate 39 as shown in FIGS. 2 and 5. Then, the film is brought into abutment with the shooting window 37 by the pressure plate 44 disposed between the guide rods 43. Therefore, it will be understood that flatness of the film can accurately be maintained.

The movie-making camera according to the invention is advantageous in that, during shooting on a double track film, there is utterly no need of opening the side cover of the body for replacing respective positions of the reels at the completion of shooting on the first track film. The inventive camera is further advantageous in that, since the side cover of the camera need not be opened for shooting on the second track film, there is no need of uselessly feeding the end portion of the first track film and the starting portion of the second track film and thus effective shooting can be made on these portions. A still further advantage resides in that, since the swinging plate is used and swingably mounted at its rear end edge in the camera body in order to effect the translational movement of the double track film, mechanical friction involved therein can be reduced and the translational movement of the film can be effected in an entirely smooth manner. In the camera of the invention, the film is inhibited from any random movement and can be correctly positioned in the proper operative position since the film is held at the shooting window by the slidable member combined with the pressure plate and translated in unitary relation with the slidable member during the innversion of the camera body. In the camera of the invention of the type in which the film is subjected to translational movement, it will be understood that the provision of two claws is especially effective since the two claws are alternately assigned for normal and reverse feed of the film. The translational movement of the film can be effected in an entirely unobstructed manner since the claws are arranged to be retracted away from perforations of the film during such movement of the film.

What is claimed is:

1. A small-sized movie camera adapted for operation with a double track film comprising a stationary supporting member having a handle grip and an objective lens, a camera body having therein a film chamber, a shutter mechanism and film feeding means and rotatably mounted on said stationary supporting member so as to be inverted upside down about the optical axis of the objective lens, and a film mounting plate in said film chamber having its rear end edge resiliently fitted to said camera body for making a swinging movement relative to said camera body and having its free end operatively positioned for effecting a translational movement of the double track film when said camera body is inverted upside down.

2. A small-sized movie camera adapted for operation with a double track film comprising a stationary supporting member having a handle grip and an objective lens, a camera body having therein a film chamber, a shutter mechanism and film feeding means and rotatably mounted on said stationary supporting member so as to be inverted upside down about the optical axis of the objective lens, a film mounting plate in said film chamber having its rear end edge resiliently fitted to said camera body for making a swinging movement relative to said camera body, a partition plate having an exposure window disposed on the optical axis of the objective lens, a slidable plate horizontally slidably mounted on said partition plate, and a pressure plate fitted to said slidable plate for effecting pressure contact of the film on said exposure window, said slidable plate being operatively connected with said film mounting plate by the free end of said film mounting plate so that said slidable plate is urged to make a translational movement for effecting a corresponding translational movement of the double track film carried thereby when the free end of said film mounting plate makes the swinging movement by the inversion of said camera body.

3. A small-sized movie camera adapted for operation with a double track film comprising a stationary supporting member having a handle grip and an objective lens, a camera body having therein a film chamber, a shutter mechanism and film feeding means and rotatably mounted on said stationary supporting member so as to be inverted upside down about the optical axis of the objective lens, a film mounting plate in said film chamber having its rear end edge resiliently fitted to said camera body for making a swinging movement relative to said camera body and having its free end operatively positioned for effecting a translational movement of the double track film when said camera body is inverted upside down, and two claws disposed in said film feeding means for feeding the film in opposite directions to each other, one of said claws being operative to feed the double track film while exposure is made on one track of the double track film, and the other claw being engageable with perforations on the other side of the film for exposing on the second track of film when the translational movement of the double track film is effected by the inversion of said camera body.

4. A small-sized movie camera adapted for operation with a double track film comprising a stationary supporting member having a handle grip and an objective lens, a camera body having a film chamber, a shutter mechanism and film feeding means and rotatably mounted on said stationary supporting member so as to be inverted upside down, a film mounting plate in said film chamber having its rear end edge resiliently fitted to said camera body for making a swinging movement relative to said camera body and having its free end operatively positioned for effecting a translational movement of the double track film when said camera body is inverted upside down, and two claws alternately engageable with perforations on respective sides of the double track film for feeding the film in a predetermined direction, said claws being adapted to be retracted away from the film passage in association with the operation for inverting said camera body upside down.

No references cited.

NORTON ANSHER, *Primary Examiner.*